US007061292B2

(12) United States Patent
Maksimovic et al.

(10) Patent No.: US 7,061,292 B2
(45) Date of Patent: Jun. 13, 2006

(54) ADAPTIVE VOLTAGE REGULATOR FOR POWERED DIGITAL DEVICES

(75) Inventors: Dragan Maksimovic, Boulder, CO (US); Sandeep C. Dhar, Boulder, CO (US)

(73) Assignee: The Regents of the University of Colorado, Boulder, CO (US)

( * ) Notice: Subject to any disclaimer, the term of this patent is extended or adjusted under 35 U.S.C. 154(b) by 45 days.

(21) Appl. No.: 10/291,098

(22) Filed: Nov. 8, 2002

(65) Prior Publication Data

US 2003/0093160 A1 May 15, 2003

Related U.S. Application Data

(60) Provisional application No. 60/345,127, filed on Nov. 9, 2001.

(51) Int. Cl.
*G05B 13/04* (2006.01)
*G05F 1/46* (2006.01)
*H03K 5/14* (2006.01)

(52) U.S. Cl. .............. 327/277; 327/161; 327/540; 327/544

(58) Field of Classification Search ........ 327/270–272, 327/276–278, 284, 538, 540, 541, 543, 544, 327/136, 149, 153, 158, 161; 324/76.54; 713/322, 401
See application file for complete search history.

(56) References Cited

U.S. PATENT DOCUMENTS

| 4,422,176 | A  | * | 12/1983 | Summers ................. 375/376 |
| 6,229,364 | B1 | * | 5/2001  | Dortu et al. ............. 327/158 |
| 6,366,157 | B1 | * | 4/2002  | Abdesselem et al. ...... 327/535 |
| 6,414,527 | B1 | * | 7/2002  | Seno et al. .............. 327/158 |
| 6,424,184 | B1 | * | 7/2002  | Yamamoto et al. ........ 327/102 |
| 6,636,093 | B1 | * | 10/2003 | Stubbs et al. ............ 327/161 |
| 6,791,420 | B1 | * | 9/2004  | Unterricker ............. 331/1 A |
| 2002/0190283 | A1 | * | 12/2002 | Seno et al. .............. 257/275 |

* cited by examiner

*Primary Examiner*—Timothy P. Callahan
*Assistant Examiner*—Terry L. Englund
(74) *Attorney, Agent, or Firm*—Patton Boggs LLP (57) ABSTRACT

Apparatus for efficiently supplying energy to a device in a circuit, the apparatus comprising a powered device having a critical path delay; delay line operative to model said critical path delay; control logic responsive to output from said delay line and operative to generate control output; and a power converter operative to adjust supply voltage to said powered device in response to said generated control output, wherein the delay line, the control logic, and the power converter cooperate to provide first order bang-bang control of said critical path delay.

37 Claims, 10 Drawing Sheets

ADAPTIVE VOLTAGE REGULATOR FOR POWERED DIGITAL DEVICES

RELATED APPLICATIONS

This application claims the benefit of U.S. Provisional Application No. 60/345,127, filed Nov. 9, 2001, entitled "ADAPTIVE VOLTAGE REGULATOR FOR DIGITAL VLSI PROCESSORS", the disclosure of which application is hereby incorporated herein by reference.

BACKGROUND OF THE INVENTION

1. Field of the Invention

The present invention relates in general to power consumption of powered devices in integrated circuits and in particular to the active control of such power consumption.

2. Statement of the Problem

The strong demand for low-power computing has been driven by a growing class of portable, battery-operated applications that demand ever-increasing functionalities with low-power consumption. The power consumption is also a limiting factor in integrating more transistors in VLSI (Very Large Scale Integration) chips for portable applications. The resulting heat dissipation also limits the feasible packaging and performance of the VLSI chip and system. Because of the quadratic dependence of power consumption on the supply voltage, reducing the supply voltage level is an effective way to reduce power consumption. However, lower supply voltage for a given technology leads to increased gate delay, and consequently, a powered device has to be operated at a reduced clock rate. More recently, adaptive (or dynamic) voltage scaling (AVS) has been proposed as an effective power management technique. Using this approach, the system supply voltage and the clock frequency of a digital VLSI application are dynamically adjusted to meet the requirements of the powered device. By reducing the supply voltage and the clock frequency of a powered device, adaptive voltage scaling offers, in principle, superior power savings compared to simple on/off power management. Successful applications have included digital signal processing systems, I/O (Input/Output) interface, and general-purpose microprocessors. At a system level, AVS requires a voltage/frequency scheduler that can intelligently vary the speed depending on requirements of a powered device. At the hardware implementation level, a desired AVS component is a controller that automatically generates the minimum voltage required for the desired speed. Desirable features of an AVS controller include: high efficiency of the power converter used to generate the variable supply voltage; an ability to make voltage adjustments over a very wide range of clock frequencies to accommodate processing speeds from stand-by to maximum throughput; and stable and fast transient response to minimize latency and losses when switching between different speed levels. Voltage regulation systems for adaptive voltage scaling include frequency locked loop (FLL) based schemes, phase locked loop (PLL) based schemes, and a delay line based speed detector. In these approaches, the control loop design requires a careful compromise between the loop stability and dynamic response times. In addition, the capture range of PLL or FLL based schemes may limit the achievable range of operating system clock frequencies. Also, since the system clock in a PLL/FLL scheme is generated by a Voltage Controlled Oscillator (VCO) operating from the supply voltage, the system clock suffers from variable clock jitter due to supply voltage noise.

One existing voltage regulation system employs a delay line based clock frequency detector. This system compares the extent of propagation of a signal through two circuits. The first circuit is a replica of a device being powered by the controlled supply voltage, $V_{DD}$, and the second circuit includes the described replica and one additional component which introduces an additional delay. The result of a comparison of signal propagation in the two circuits generates a value supplied to an accumulator. The accumulator value is appropriately updated with the supplied value, and in turn, supplies the updated accumulator value to a duty cycle controller within a Buck converter. Thereafter, the Buck converter employs a second order system to produce a voltage output based on the updated accumulator value.

The above-described approach involves a third order system which introduces several problems. One problem is that the disclosed delay line requires many system clock cycles to complete an evaluation of the instant clock speed sufficiency. The time needed to update the accumulator and establish a modified duty cycle adds more delay to the system. Finally, the second order circuit located between the duty cycle controller and the voltage output introduces still more delay.

The various processing stages of the existing system risk incurring instability in the control loop which controls the voltage supplied to both the powered device and the delay line circuit. Accordingly, the bandwidth of this voltage regulation system is deliberately limited to provide stability. However, limited regulation bandwidth introduces performance limitations. Specifically, during a high-to-low voltage transition, a slower-than-needed reduction in supply voltage will incur excess power consumption, thereby partially defeating the purpose of voltage control. Moreover, during a low-to-high voltage transition, an excessively slow supply voltage increase runs the risk of disabling proper operation of the powered device.

Separately, it is a problem that twice replicating the circuitry of the powered device in a delay line requires the allocation of much valuable space within an integrated circuit. Therefore, there is a need in the art for a system and method for device voltage regulation which is compact, inherently stable over a wide range of system frequencies, and highly responsive to the instantaneous voltage supply requirements of a powered device.

SOLUTION

The present invention advances the art and helps to overcome the aforementioned problems by providing voltage regulation to a powered device employing a first order system which is highly responsive and stable over a wide range of frequencies. The voltage regulation system (adaptive voltage scaling system) preferably employs first order bang-bang control to control the critical path delay of a device powered by a regulated voltage. This control system approach effectively forces the critical path delay to remain within a defined working delay range. Controlling the critical path delay as described is accomplished by forcing the voltage supplied to a powered device to remain as low as possible for a desired system clock frequency. The disclosed bang-bang control system is both inherently stable and highly responsive to transient conditions over a wide range of system clock frequencies. Moreover, in the embodiments disclosed herein, the system clock frequency and supply voltage (to the powered device) are generated independently, thereby minimizing the problem of system clock jitter.

In one embodiment, the critical path delay of a powered device is controlled by measuring propagation of a test signal through a delay line and providing a voltage control output responsive to the measured test signal propagation. For example, an excessively long critical path delay of a powered device is measured by detecting a shorter-than-desired extent of test signal propagation through a delay line. The voltage regulation system preferably increases the supply voltage to the powered device in response to this condition.

Numerous other features, objects and advantages of the invention will become apparent from the following description when read in conjunction with the accompanying drawings in which:

DETAILED DESCRIPTION OF THE PREFERRED EMBODIMENT

In one embodiment, "bang-bang control" is a type of control in which a control output value is either at its maximum, zero, or minimum. In another embodiment, bang-bang control is a type of control in which the output assumes only two possible values: a maximum value or a minimum value. In this disclosure, a first order control system is a system in which a "high" or "maximum" control signal value changes the output variable of interest in a first direction, and a "low" or "minimum" control signal value changes the output variable in a second direction opposite the first direction. In this disclosure, "control output" is one or more control signals output from a control logic circuit. In this disclosure, a control signal is preferably an output from a control logic circuit and an input to a power converter. Preferably, the output from a power converter or other system receiving one or more control signals is an output variable.

In this disclosure, a "powered device" is a device being powered by a supply voltage. A "task" is an operation performable by the powered device. A "critical path delay" is the time required for a signal to propagate through the longest path in the powered device. "Test signal propagation" is the propagation of a test signal along a path. A "critical path model" is a sequence of cells (integrated circuit components) which models at least a portion of the critical path delay of a powered device.

Figure 2:
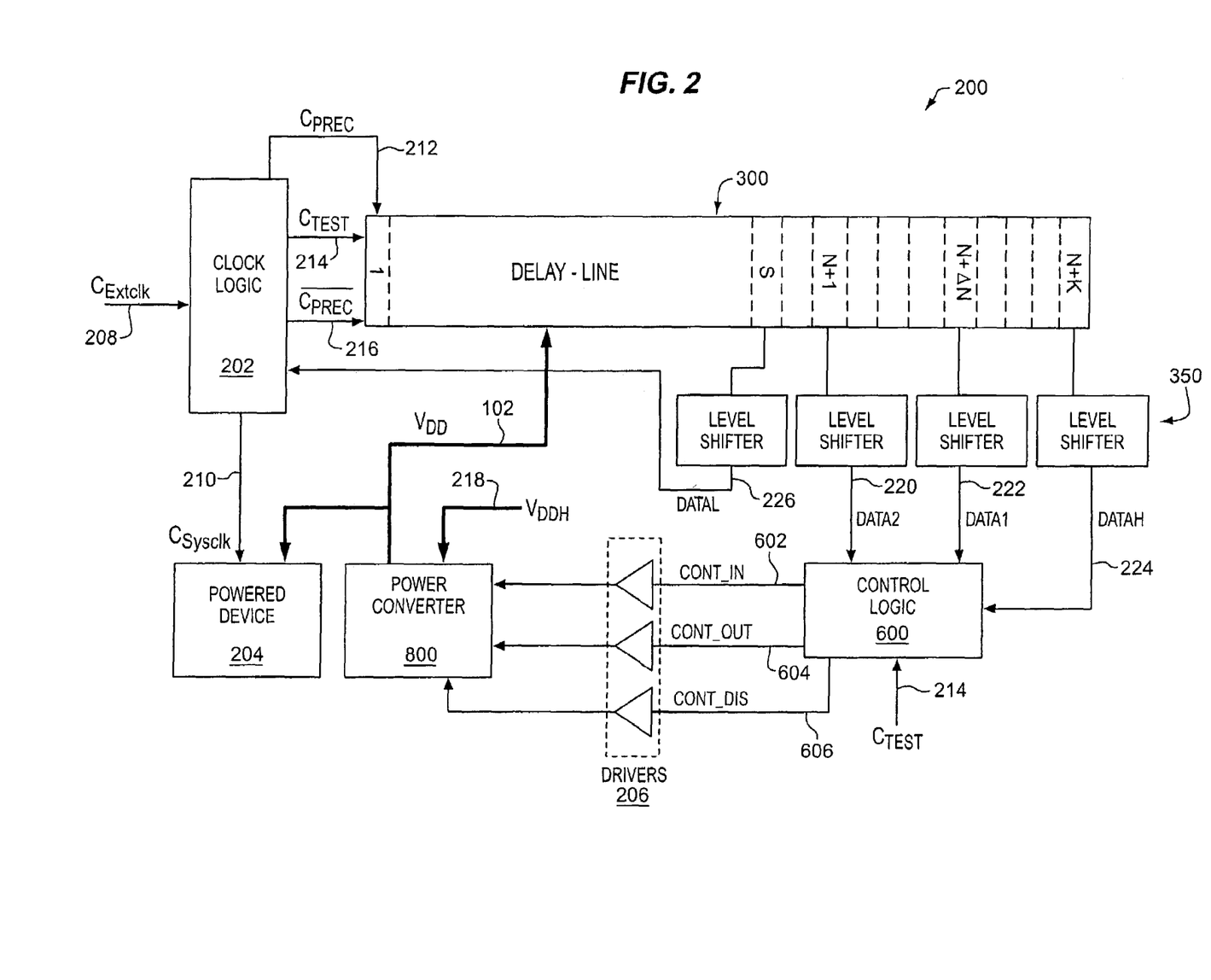
FIG. 2 is a block diagram of a system for controlling the critical path delay of a powered device.

A discussion of elements of a selection of the FIGS. is presented in this section. The function associated with matter depicted in all of FIGS. 1–14 is discussed thereafter. FIG. 2 is a block diagram 200 of a system for controlling critical path delay 152 of powered device 204. In FIG. 2, signal $C_{extclk}$ 208 feeds into clock logic 202 which in turn provides output signals $C_{prec}$ 212, $C_{test}$ 214, and $\overline{C_{prec}}$ 216 to delay line 300. Signal $C_{sysclk}$ 210 is directed from clock logic 202 to powered device 204. Delay line 300 is preferably coupled to level shifter array 350, which in turn provides signals DATA2 220, DATA1 222, and DATAH 224 to control logic 600. Signal $C_{test}$ 214 is also directed to control logic 600. DATAL 226 is directed from level shifter array 350 to clock logic 202.

In one embodiment, signals CONT_IN 602 CONT_OUT 604, and CONT_DIS 606 are directed from control logic 600 through drivers 206 to power converter 800. Voltage $V_{DDH}$ 218 is supplied to power converter 800, and voltage $V_{pp}$ 102 is directed from power converter 800 to power device 204 and delay line 300.

Figure 3:
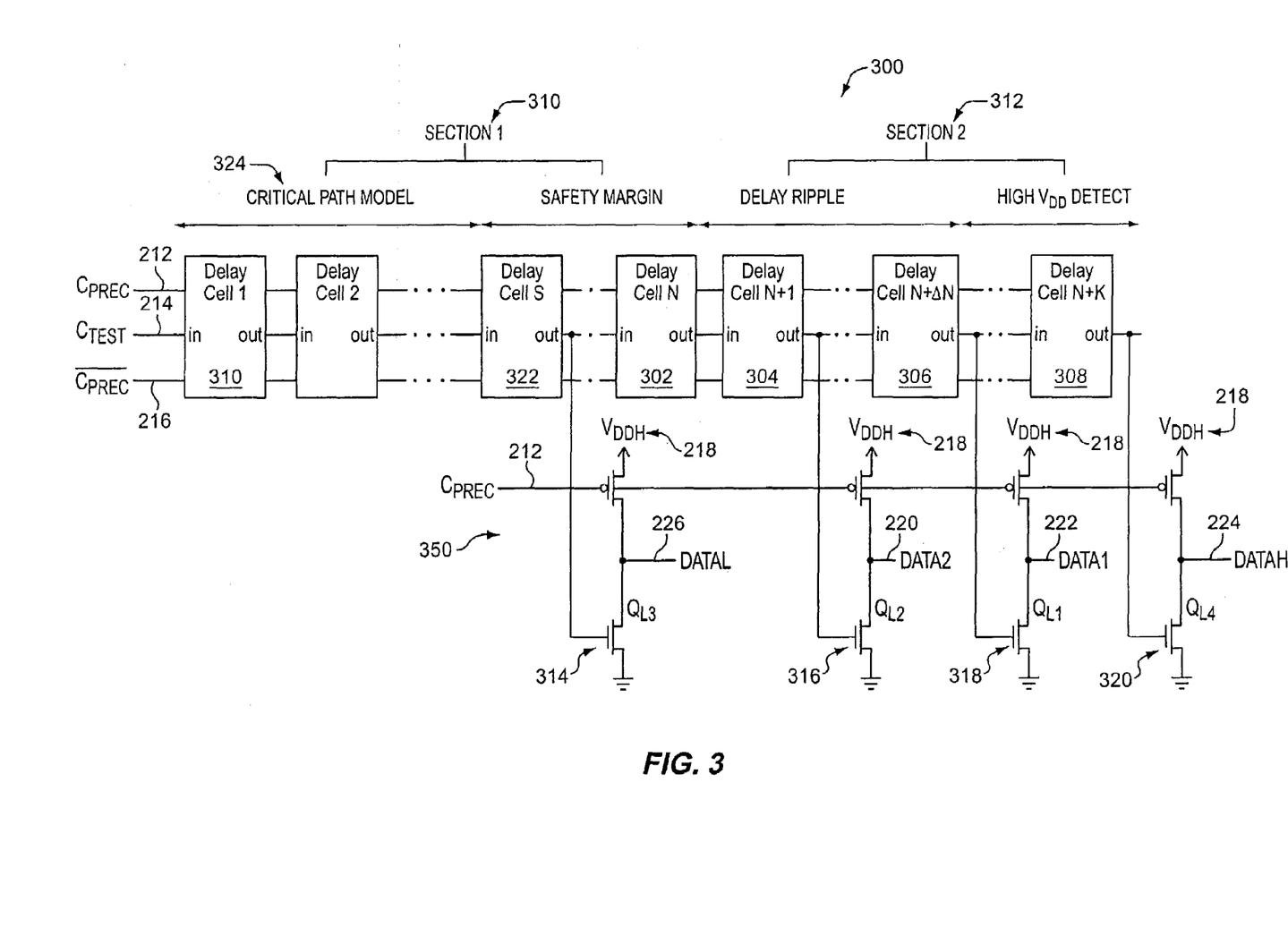
FIG. 3 is a more detailed block diagram of the delay line shown in simplified form in FIG. 2.
Figure 4:
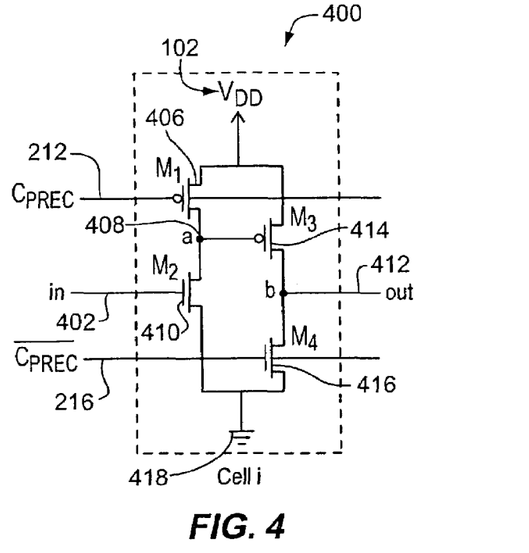
FIG. 4 is a schematic diagram of a typical delay cell shown in simplified form in the delay line of FIG. 3.

FIG. 4 is a schematic of a typical delay cell 400 shown in simplified form in the delay line of FIG. 3. In FIG. 4, M1 406, M2 410, M3 414, and M4 416 may be any type of transistor or other switch. For the sake of the following discussion, each of transistors M1–M4 is considered to have one switching connection, or gate, and two switched connections. $V_{DD}$ 102 is preferably connected to the upper switched connections of both M1 406 and M5 414. The lower switched connection of M1 is connected to node "a" 408 and to the upper switched connection of M2 410. The lower switched connection of M2 410 is preferably connected to ground 418. Node "a" 408 is preferably connected through an inverter to the gate of M3 414. The lower switched connection of M3 414 is preferably connected to node "b" 412 and to the upper switched connection of M4 416. The lower switched connection of M4 416 is preferably connected to ground 418.

In one embodiment, signal $C_{prec}$ 212 is connected through an inverter to the gate of M1 406. Signal "in" 402 is preferably connected to the gate of M2 410. Signal 216 corresponding to $\overline{C_{prec}}$ is preferably connected to the gate of M4 416.

Figure 6:
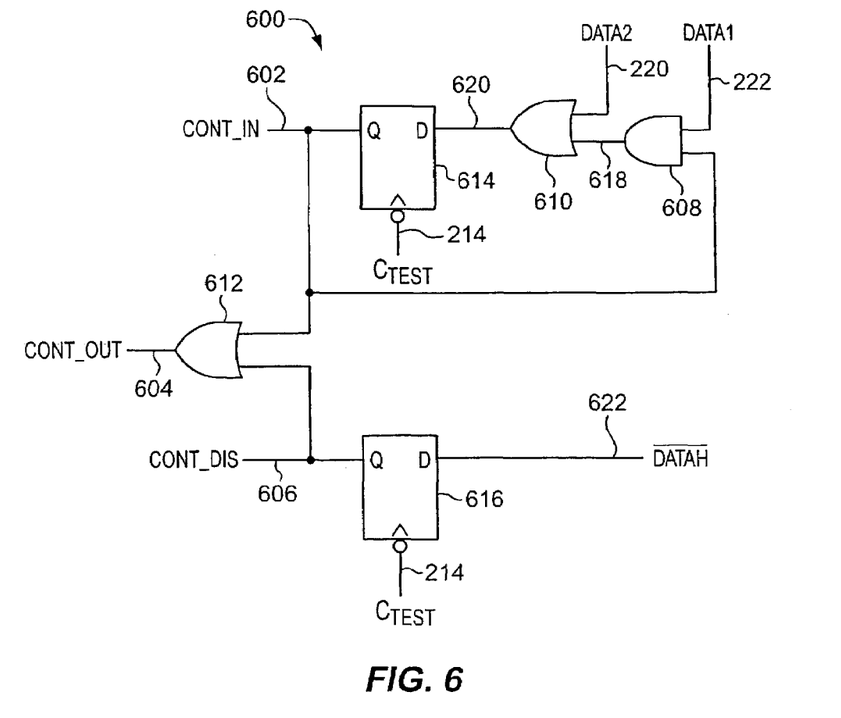
FIG. 6 is a schematic diagram of the control logic used to generate control signals for input to a power converter.

FIG. 6 is a schematic representation of control logic 600 used to generate control signals 602, 604, and 606 for input to power converter 800. In FIG. 6, DATA1 222 and feedback from CONT_IN signal 602 are preferably directed to AND gate 608. Output 618 from AND gate 608 is preferably directed to OR gate 610 along with DATA2 220. The output 620 from OR gate 610 is preferably directed to clocked flip-flop 614 which is clocked by $C_{test}$ 214. CONT_IN signal 602 is the output from flip-flop 614.

In one embodiment, signal $\overline{DATAR}$ 622 is directed to clocked flip-flop 616, which flip-flop is clocked by signal $C_{test}$ signal 214. The output from flip-flop 616 is CONT_DIS signal 606. Preferably, CONT_DIS signal 606 and CONT_IN signal 602 are directed to OR gate 612, which produces OR gate 612 output signal CONT_OUT 604.

Figure 8:
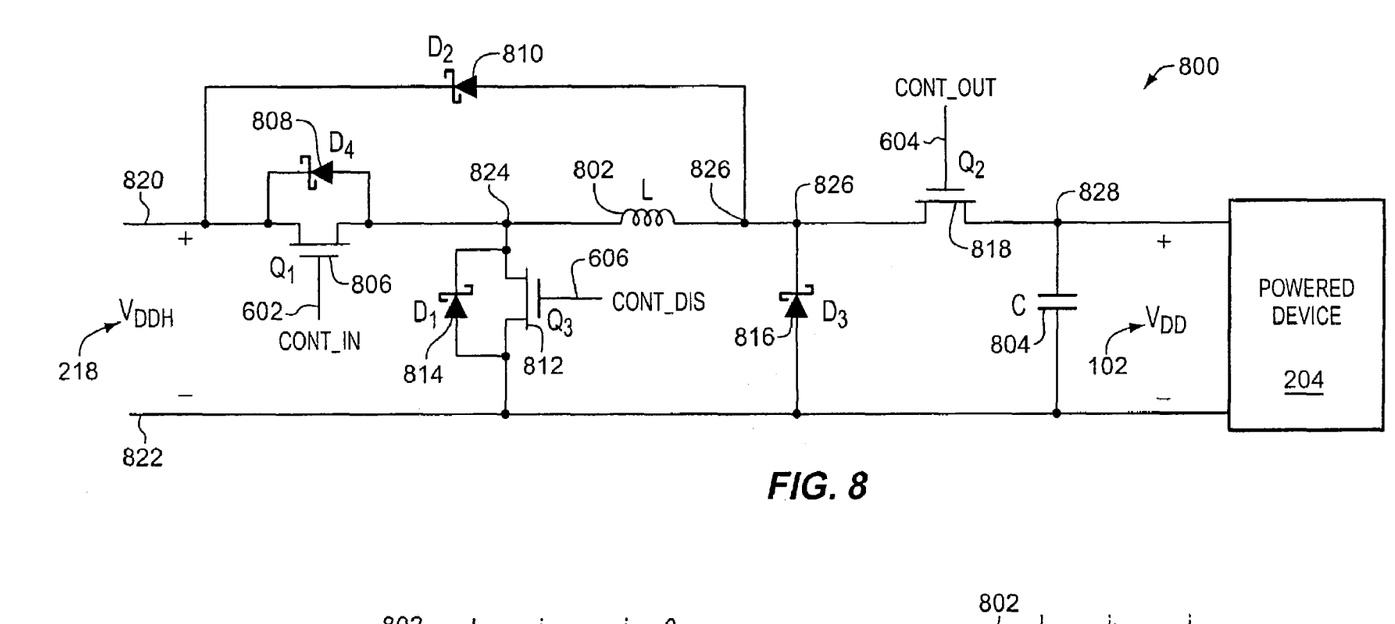
FIG. 8 is a schematic diagram of the power converter shown in FIG. 2.

FIG. 8 is a schematic diagram of power converter 800 shown in FIG. 2. In the context of FIG. 8, diodes D1–D4 are preferably Schottky diodes. $V_{DDH}$ 218 is preferably applied across node 820 (positive side of $V_{DDH}$) and node 822 (negative side of $V_{DDH}$). Signal CONT_IN 602 is supplied to the gate of transistor Q1 806 which connects node 820 to node 824. Diode D4 808 is preferably connected in parallel with transistor Q1 806, in between node 820 and node 824, with the diode oriented to allow current flow from node 824 to node 820. Inductor 802 is located between node 824 and node 826. Diode D2 810 is preferably located in a separate conductive path between node 820 and node 826, in parallel with the sequence of the parallel combination of D4 808 and Q1 806, followed by inductor 802. Diode D2 810 is preferably oriented to allow current flow from node 826 to node 820.

Preferably, signal CONT_DIS is directed to the gate of transistor Q3 812 which couples node 824 to node 822. Diode D1 814 is preferably located on a separate conductive path between node 824 and node 822, in parallel with transistor Q3 812. Diode D1 814 is preferably oriented to allow current flow from node 822 to node 824. Preferably, diode D3 816 is located on a conductive path between node 826 and node 822. Diode D3 816 is preferably oriented to allow current flow from node 822 to node 826. Preferably, signal CONT_OUT 604 is directed to the gate of transistor Q2 818 which transistor's switched connections are coupled to node 826 and node 828. Capacitor 804 and powered device 204 are connected in parallel between node 828 and node 822.

Figure 1A:
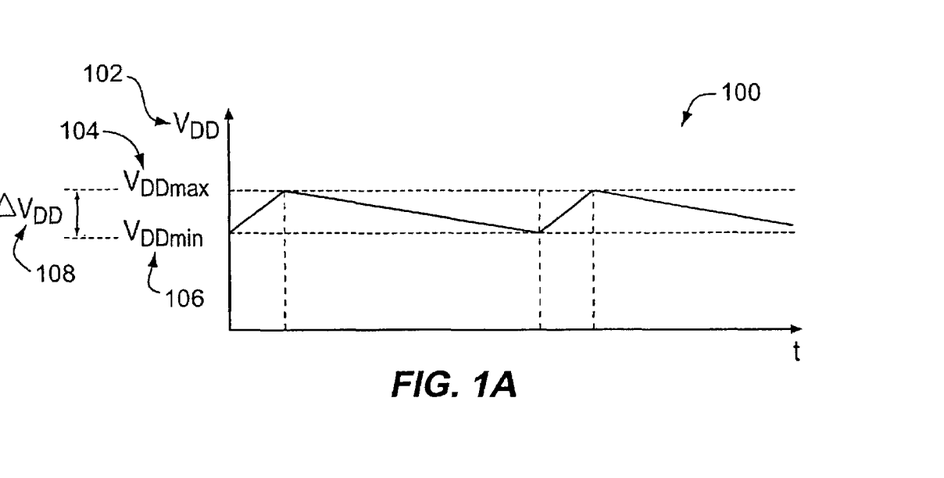
FIG. 1A is a plot of supply voltage $V_{DD}$ as a function of time.
Figure 1B:
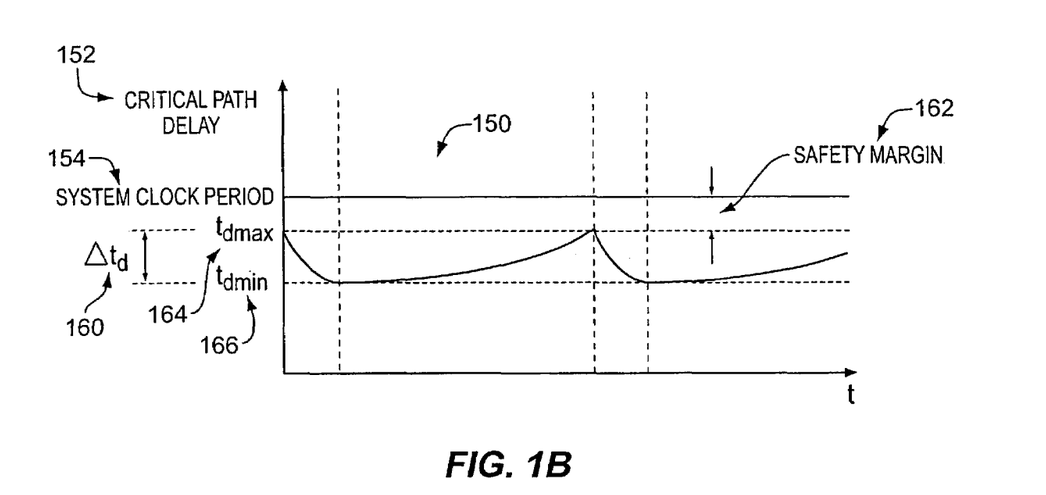
FIG. 1B is a plot of critical path delay as a function of time.

In one embodiment, the critical path delay of a powered device is controlled by controlling the supply voltage $V_{DD}$ 102 for the powered device. One way of controlling critical path delay 152 of powered device 204 (FIG. 2) is illustrated by the waveforms in FIG. 1. For a particular clock frequency of powered device 204, a change of $V_{DD}$ 102 within the limits $V_{DDmax}$ 104 and $V_{DDmin}$ 106 results in critical path delay 152 varying non-linearly between limits $t_{dmin}$ 166 and $t_{dmax}$ 164.

Figure 15:
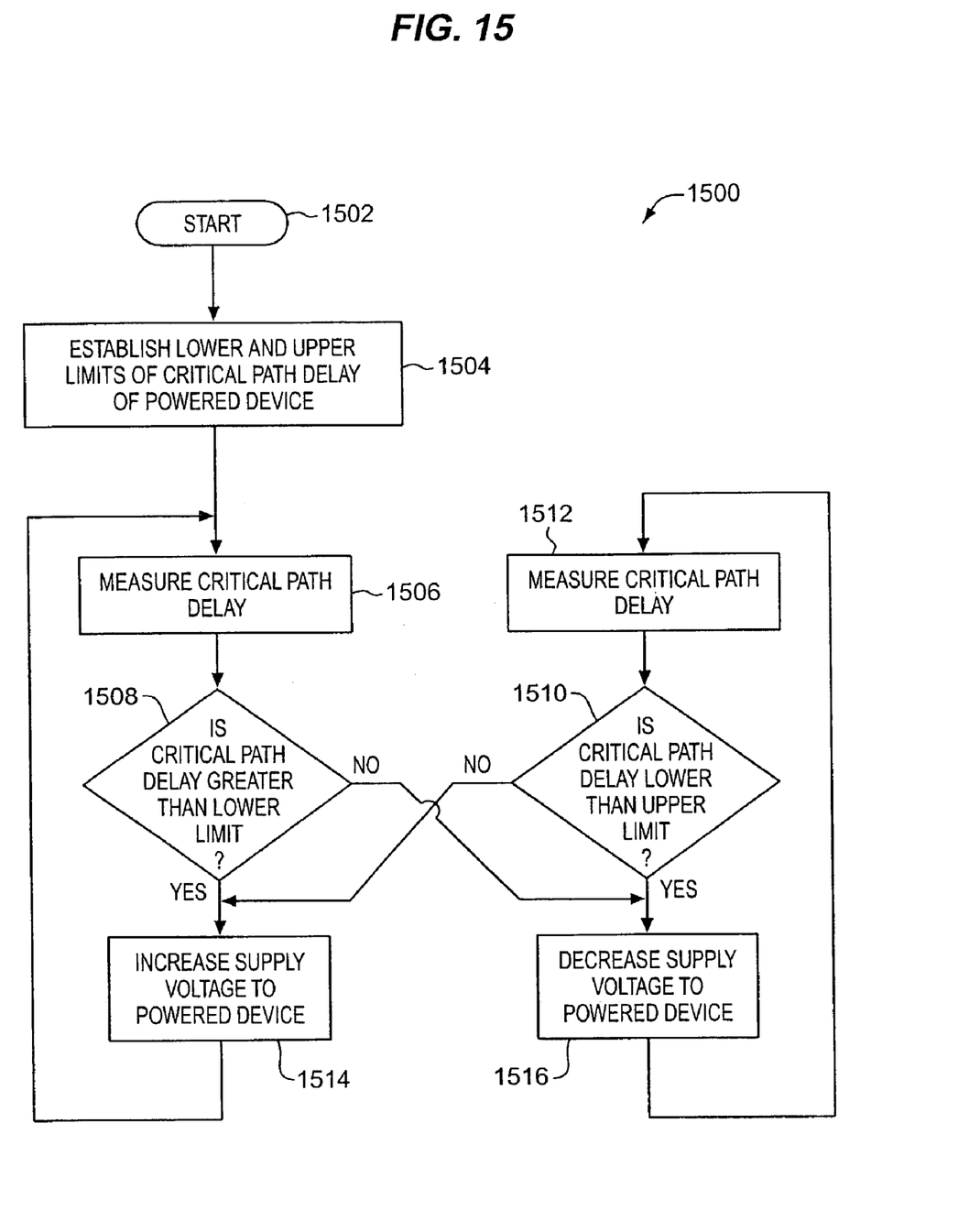
FIG. 15 is a flow chart of a critical path delay control scheme.

A preferred bang-bang control scheme for critical path delay $t_d$ 152 operates as described below. Reference is made to FIG. 1 and FIG. 15 in the following discussion. Operation preferably starts at step 1502 of flow chart 1500. Preferably, an upper limit $t_{dmax}$ 164 and a lower limit $t_{dmin}$ 166 are established 1504. Critical path delay $t_d$ 152 is then preferably measured 1506. The measured critical path delay $t_d$ 152 is then preferably compared 1508 to the lower limit $t_{dmin}$ 166.

If critical path delay 152 is greater than the lower limit $t_{dmin}$ 166, a control signal is preferably activated to increase 1514 supply voltage $V_{DD}$ 102. Measurement 1506 and comparison 1508 of critical path delay 152 with lower limit $t_{dmin}$ 166 is then preferably repeated. The control signal activated to increase 1514 supply voltage $V_{DD}$ 102 preferably remains unchanged until critical path delay 152 is at lower limit $t_{dmin}$ 166. When critical path delay 152 becomes equal to lower limit $t_{dmin}$ 166, the control signal is preferably activated to reduce 1516 supply voltage $V_{DD}$ 102. Preferably, critical path delay 152 is then measured 1512 and compared 1510 to upper limit $t_{dmax}$ 164. The control signal to reduce 1516 supply voltage $V_{DD}$ 102 preferably remains unchanged until critical path delay 152 equals upper limit $t_{dmax}$ 164. When critical path delay 152 is at upper limit $t_{dmax}$ 164, the control signal is preferably activated to increase 1514 supply voltage $V_{DD}$ 102. The range of critical path delay 152 which is less than upper limit $t_{dmax}$ 164 and greater than lower limit $t_{dmin}$ 166 is the "working delay range." As long as time variations of $V_{DD}$ 102 are monotonic (increasing or decreasing depending on the control signal), and $t_d$ 152 is a monotonic function of VDD 102, the control loop is stable, and the transient response is determined by the system open-loop response.

FIG. 2 is a block diagram of a system 200 for controlling the critical path delay 152 of a powered device 204. System 200 preferably includes five components. A first component is power converter 800 which preferably receives $V_{DDH}$ 218 as the input voltage and produces the supply voltage $V_{DD}$ 102, which is generally less than $V_{DDH}$ 218, for powered device 204. A second preferred component is delay line 300 which is powered by supply voltage $V_{DD}$ 102 and which is preferably driven by the test clock signal $C_{TEST}$ 214 and precharge clocks $C_{PREC}$ 212 and $\overline{C_{PREC}}$ 216 at a desired system clock frequency 210 for powered device 204. Clock frequencies between 10 KHz (Kilohertz) and 40 MHz (MegaHertz) have been employed. A third preferred component is level shifter array 350 which converts the test signal voltages taken from various taps across delay line 300 to voltage levels compatible with control logic 600.

In one embodiment, a fourth preferred component is control logic 600 which completes a control loop and which is preferably updated with every falling edge of $C_{TEST}$ 214. A fifth preferred component is clock logic 202 which preferably generates test clock signal $C_{TEST}$ 214 which is non-overlapping with the precharge clocks, $C_{PREC}$ 212 and $\overline{C_{PREC}}$ 216, and the system clock signal 210.

In one embodiment, delay line 300 in system 200 is made up of several identical cells grouped in two sections as shown in FIG. 3. Section 1 310 preferably includes N cells, which include critical path model 324, which models half the critical path delay 152 of powered device 204. Section 1 310 preferably also includes a small safety margin 162 (FIG. 1). Section 2 312 preferably includes K cells. A first part of Section 2 312 preferably includes ΔN cells (ending with cell 306) that model delay ripple $\Delta\ t_d$ 160=$t_{dmax}$ 164−$t_{dmin}$ 166. The remaining K−ΔN cells are used, to determine when $V_{DD}$ 102 has exceeded its desired level according to the above-described control scheme.

Figure 5:
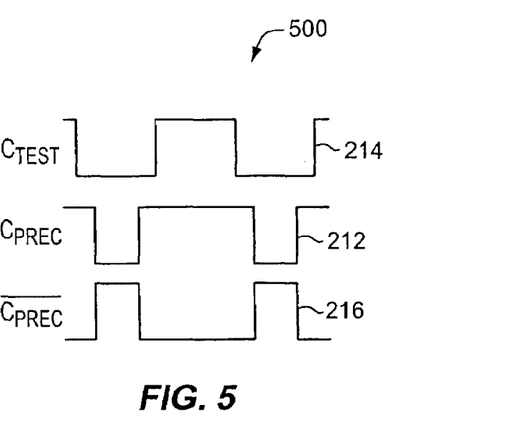
FIG. 5 is a plot of the relation between a test clock signal and precharge signals.

Operation of delay line 300 is understood by referring to the device level schematic of exemplary delay cell 400 shown in FIG. 4 and clock waveforms 500 of FIG. 5. When precharge clock $C_{prec}$ 212 is at logic 0, devices M1 406 and M4 416 preferably precharge node "a" 408 and node "b" 412 to logic 1 (i.e., $V_{DD}$), and 0 (ground), respectively. When test signal $C_{TEST}$ 214 is at logic 1, test signal 214 preferably propagates from node "in" 402 to node "out" 412 via devices $M_2$ 410 and $M_3$ 414.

For first cell 310 in delay line 300, input node in 402 is preferably connected to signal $C_{test}$ 214. For the remaining cells, the node $out_{i-1}$ is connected to the node $in_i$. Referring to FIG. 3, signal taps are taken from delay cells of SECTION 2, N+1 304, N+ΔN 306, and N+K 308 and are preferably level-shifted for compatibility with control logic 600, which is preferably powered by $V_{DDH}$ 218. These signals drive the transistors $Q_{Li}$ (314, 316, 318, and 320) and pull nodes DATAi (220, 222, 224, and 226) to logic 0 if $C_{TEST}$ 214 propagates through delay line 300 within system clock period 154 (FIG. 1). In desired steady state operation, $V_{DD}$ 102 is sufficient for $C_{TEST}$ 214 to propagate through cell N 302 but not high enough for it to propagate through cell N+K 308.

It is known in the art that the delay of a simple logic gate can accurately represent the delay in more complicated structures. Therefore, a delay line, such as delay line 300 in FIG. 4, can be used to model the critical path delay of a powered device. Modeling a critical path delay may be accomplished by testing the powered device at a process corner which allows the application to work at its maximum speed under worst-case input data conditions, i.e., at a maximum supply voltage, and at a maximum clock frequency $f_{sysclk,max}$. Preferably, a delay cell is then designed using the model parameters for that process corner. Next, a delay line length N+ΔN is selected such that a test clock signal, such as $C_{test}$ 214 in FIG. 3, at the maximum system clock frequency, is just able to propagate through the selected delay line when the supply voltage to the delay line is at its maximum value. The selected delay line length N+ΔN is a product of the sizes and associated propagation delays of the individual cells selected for inclusion in the delay line.

The selection of device sizes also affects the output voltage ripple $\Delta V_{DD}$ 108. Since testing critical path delay 152 of powered device 204 takes one half of system clock period 154 (i.e. when $C_{TEST}$ 214 is at logic 1), a preferred critical path model effectively captures half of the worst-case critical path delay of a particular powered device. Where a delay line is fabricated on the same chip as a powered device, the delay line characteristics preferably scale with the application for voltage, process, or temperature variations.

It should be noted that for proper testing of the $V_{DD}$ 102 value, $C_{TEST}$ 214 preferably has a 50% duty cycle. Instead of placing this responsibility on the external clock, in a preferred embodiment, the test clock and the system clock are obtained by dividing an external clock (at $f_{extclk}=2f_{Sysclk}$) by 2.

FIG. 6 shows the implementation of the control logic 600 which receives level-shifted delay line taps DATA2 220, DATA1 222, and $\overline{DATAH}$ 622 as inputs and outputs control signals CONT_IN 602, CONT_OUT 604, and CONT_DIS 606 to power converter 800. Preferably, a logic "1" at a representative input DATAi implies that $C_{test}$ 214 did not propagate to that input within system clock period 154.

Signals 602, 604, and 606 are explained below with reference to the power converter 800 shown in FIG. 8. In the following, Q1–Q3 may be transistors or other types of switches. CONT_IN signal 602 preferably controls input side switch $Q_1$ 806. When turned on, switch $Q_1$ 806 preferably connects $V_{DDH}$ to the converter network. CONT_OUT signal 604 controls output side switch $Q_2$ 818. When turned on, switch $Q_2$ 818 allows the charging or discharging of output capacitor 804 through power converter 800. CONT_DIS signal 606 preferably controls output discharge switch $Q_3$ 812. When turned on in conjunction with switch $Q_2$ 818, it allows capacitor 804 to discharge through inductor 802.

Figure 7A:
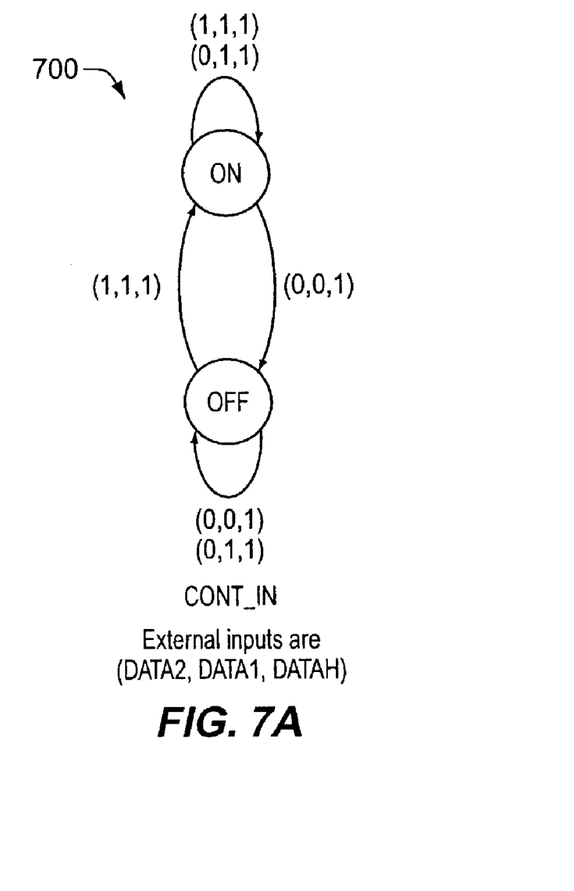
FIG. 7A is a state diagram showing the state of the CONT_IN signal as a function of data outputs from the delay line of FIG. 3.
Figure 7B:
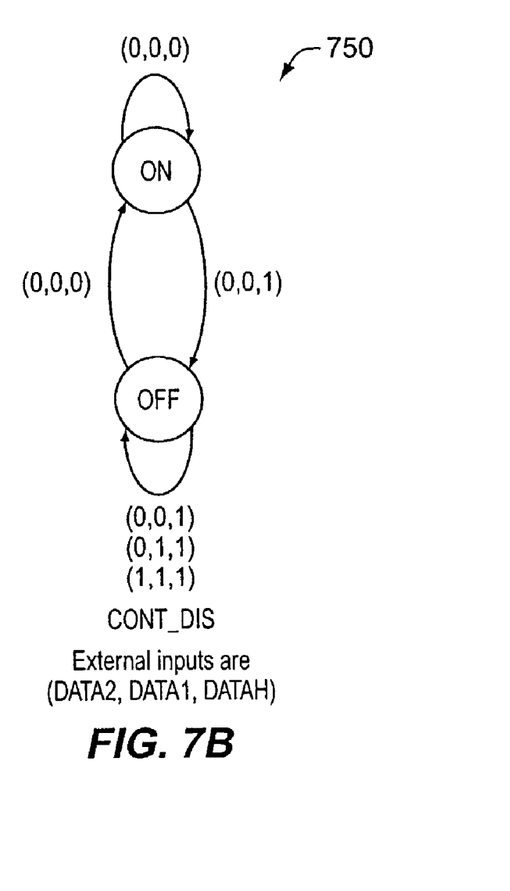
FIG. 7B is a state diagram showing the state of the CONT_DIS signal as a function of a set of data outputs from the delay line of FIG. 3.

FIGS. 7A and 7B are state diagrams for control outputs CONT_IN 602 and CONT_DIS 606. CONT_OUT 604 preferably equals the logic sum of control signals CONT_IN 602 and CONT_DIS 606 (see FIG. 6). For example, during steady state operation, inputs to control logic 600 (DATA2 220, DATA1 222, and $\overline{DATAR}$ 622) have values (0, 1, 1) which indicate that $V_{DD}$ 102 is high enough for $C_{test}$ 214 to propagate through delay cell N 302 (FIG. 2), but not high enough to propagate through the additional delay ripple of ΔN cells ending with cell N+ΔN 306 (FIG. 2). Depending on the previous state of the converter switches 806 and 812 and the supply voltage limit ($V_{DDmin}$ or $V_{DDmax}$) reached, power converter switches 806 and/or 812 are turned on or off.

While any step-down switch-mode power converter should suffice, a desirable property of power converter 800 is that in steady state operation $V_{DD}$ 102 should start increasing when control signal CONT_OUT 604 is at logic "1" and start decreasing when CONT_OUT 604 is at logic "0". This allows for a simple, stable bang-bang control of critical path delay 152 and therefore of the output voltage ripple.

Power converter 800 (FIG. 8) is preferably a modified Watkins-Johnson (WJ) converter. The WJ converter has the desirable property that the output voltage will always decrease when the converter switches are turned off as compared to a standard step-down (buck) converter. Power converter 800 is preferably operated in the discontinuous conduction mode (DCM) in steady state so that converter switches $Q_1$ 806 and $Q_2$ 818 only turn on for short time periods. Current through inductor 802 is generally discontinuous and is preferably zero at the end of converter 800 switching period.

Figure 9A:
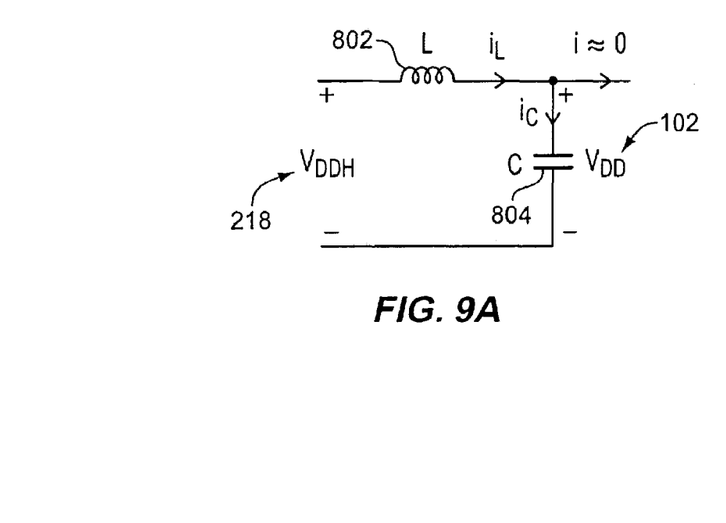
FIG. 9A is a schematic of a network for modeling the response of the power converter of FIG. 8 to a step change from a low value to a high value of an external clock frequency.

To minimize latency and/or additional losses, it is desirable to have fast transient response to step changes in system clock frequency 210. The transient response of power converter 800 to a step change from low to high $f_{Extclk}$ is preferably determined by a simple open loop model shown in FIG. 9A. Where power converter 800 operates sin DCM, current through inductor 802 is initially zero. During a voltage transient, supply voltage $V_{DD}$ 102 is too low to enable operation of powered device 204, and system clock signal $C_{sysclk}$ 210 (FIG. 2) is disabled. During this time, powered device 204 consumes almost no current (i≈0). As a result, $i_L(t)=i_C(t)$ during the transient. Capacitor 804 voltage $V_{DD}(t)$ is at some initial value $V_{DD0}$. At t=0, switches $Q_1$ 806 and $Q_2$ 818 are closed, and voltage $V_{DDH}$ 218 is applied across terminals 820, 822 of the network 800. Equation (1) enables determination of the time taken for the capacitor voltage to reach a value $V_{DD1}>V_{DD0}$.

$$t_{low \to high} = \sqrt{LC} \cdot \cos^{-1}\left(\frac{V_{DDH} - V_{DD1}}{V_{DDH} - V_{DD0}}\right) \tag{1}$$

Figure 9B:
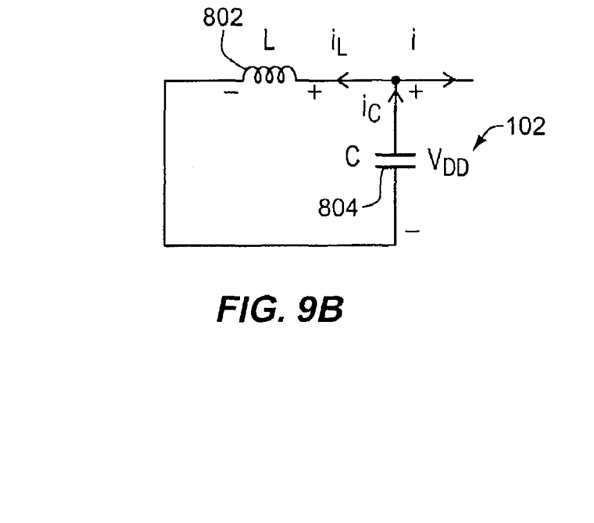
FIG. 9B is a schematic representation of a network for modeling the response of the power converter of FIG. 8 to a step change from a high value to a low value of an external clock frequency.

Similarly, the transient response of power converter 800 to a step change from high to low $f_{Extclk}$ is determined by the simple open-loop model shown in FIG. 8. Preferably, inductor 802 current is initially zero. Preferably, capacitor 804 is at some initial voltage $V_{DD0}$ and discharges with load current i. At t=0, switches $Q_2$ 818 and $Q_3$ 812 are turned off, and capacitor 804 also discharges through inductor 802. It is desired to determine the time needed for capacitor 804 voltage to reach a value $V_{DD1} > V_{DD0}$. Where load current is ignored for the sake of simplicity, the solution is provided by equation (2).

$$t_{high \to low} = \sqrt{LC} \cdot \cos^{-1}\left(\frac{V_{DD1}}{V_{DD0}}\right) \quad (2)$$

Generally, the actual transient time is less than that indicated by equation (2), since capacitor 804 may also discharge through powered device 204. Equations (1) and (2) show that the transient responses are of the order of the square root of LC.

In steady state operation, switches 806, 812, 818 turn on for a short time interval $t_{ON}$, charging capacitor C 804 to $V_{DDmax}$ 104, followed by a longer period $t_{OFF}$ over which capacitor 804 discharges to $V_{DDmin}$ 106. Where $t_{off}$ is much longer than $t_{on}$, the capacitor 804 charging period can be ignored, and the switching period of the converter $T_{sw}$ equals $t_{OFF}$.

$$T_{sw} = t_{OFF} = \frac{C \cdot \Delta V_{DD}}{I} \quad (3)$$

Consequently the converter switching frequency $f_{sw}$ can be given as:

$$f_{sw} = \frac{I}{C \cdot \Delta V_{DD}} = \frac{P}{V_{DD} \cdot C \cdot \Delta V_{DD}} \quad (4)$$

where P is the power consumption of powered device 204. However, $\Delta V_{DD}$ 108 depends on the delay line parameters (N and $\Delta N$) and $V_{DD}$ 102. This dependence can be found as follows. At the minimum value of $V_{DD}$ 102, $V_{DDmin}$, the delay through the critical path model is provided by equation (5):

$$t_N = N \cdot t_{cell} = N \cdot g(V_{DD}) \quad (5)$$

where $t_{cell}$ is the delay through a delay-cell and is a function of $V_{DD}$, i.e., $t_{cell} = g(V_{DD})$.

At the peak value of $V_{DD}$ 102, $V_{DDmax}$, the delay through the delay line is given by equation (6).

$$t_N + \Delta N = (N + \Delta N) \cdot g(V_{DD} + \Delta V_{DD}) \quad (6)$$

Since the delays shown in equations (5) and (6) represent the test portion of $C_{TEST}$ 214, the two delays are equal. Equating the two sides and simplifying by keeping only the linear terms in the Taylor expansion gives us:

$$\Delta V_{DD} \approx \frac{\Delta N}{N} \cdot \frac{g(V_{DD})}{g'(V_{DD})} \quad (7)$$

Furthermore, the relation between $t_{cell}$ and $V_{DD}$ 102 was obtained by a curve-fit to be approximated as:

$$g(V_{DD}) = \frac{K}{(V_{DD} - V_0)^{1.5}}, \quad K = 2.736 \cdot 10^{-9}, \quad V_0 = 0.74 \quad (8)$$

Taking the derivative and substituting in equation (7), we have:

$$\Delta V_{DD} \approx \frac{2}{3} \cdot \frac{\Delta N}{N} \cdot (V_{DD} - V_0) \quad (9)$$

As $V_{DD}$ 102 increases, so does $\Delta V_{DD}$. The delay line parameters N and $\Delta N$ can thus be set to limit the output voltage ripple at the maximum supply voltage. The output voltage ripple is not determined by the converter parameters, which is an advantage of the scheme since it allows for straightforward design of power converter 800. To a first order, the power consumption P of powered device 204 is given by equation (10).

$$P \approx C_{pd} \cdot V_{DD}^2 \cdot f_{Sysclk} \quad (10)$$

where $C_{pd}$ (capacitance of powered device) is a constant. Substituting for P and $\Delta V_{DD}$ in equation (4) yields:

$$f_{sw} \approx \frac{3}{2} \cdot \frac{C_{pd}}{C} \cdot \frac{N}{\Delta N} \cdot \frac{V_{DD}}{(V_{DD} - V_0)} \cdot f_{Sysclk} \quad (11)$$

Since the test period is also one half of the system clock period 154, $f_{sysclk}$ can be related to $V_{DD}$ 102 using equation (8), which yields:

$$f_{Sysclk} = \frac{1}{2 \cdot N \cdot g(V_{DD})} \approx \frac{(V_{DD} - V_0)^{1.5}}{2 \cdot N \cdot K} \quad (12)$$

Substituting in equation (11) gives us:

$$f_{sw} \approx \frac{3}{4} \cdot \frac{C_{pd}}{C} \cdot \frac{V_{DD}\sqrt{V_{DD} - V_0}}{\Delta N \cdot K} \quad (13)$$

This relation indicates that the converter switching frequency increases with $V_{DD}$ (and $f_{Sysclk}$). This is desirable, because it implies that the converter switching frequency scales with system clock frequency. As a result, switching losses in the converter also scale with powered device 204 load power, and power converter 800 can maintain relatively high efficiency over a wide range of operating conditions.

As shown in equations (1), (2), and (13), $f_{sw}$ (power converter 800 switching frequency) is inversely proportional to the capacitance of capacitor 804, and the transient responses are of the order of the square root of LC. Hence, C (the capacitance value of capacitor 804) can be selected to set the switching frequency. It is desirable to have a small capacitance value for capacitor 804 so that the transient response is faster, and losses during the transient period smaller. However, a higher switching frequency generally results in higher switching losses, which reduce the steady-state power efficiency of the converter. Using equation (10), $C_{pd}$ can be determined from power consumption of the application for the measured $V_{DD}$ and $f_{Sysclk}$. N and $\Delta N$ have already been selected to limit the output voltage ripple. Hence, the capacitance value of capacitor 804 ("C") can be selected to set the maximum switching frequency at the maximum supply voltage. Once C has been selected, L (the inductance of inductor 802) is selected to adjust the transient response time. The lower limit on transient time is constrained only by the ability of power switches to conduct increased peak inductor current and the conduction losses in the converter switches.

One preferred embodiment of system 200, except for external L and C, was designed in a standard Complementary Metal Oxide Semiconductor (CMOS) process. Extensive Spice simulations were performed on system 200. A chip implementing the system 200 was designed in a 1.5 micron standard CMOS process. In one embodiment, the area taken up by system 200 including pads is 0.88 mm$^2$.

Figure 10:
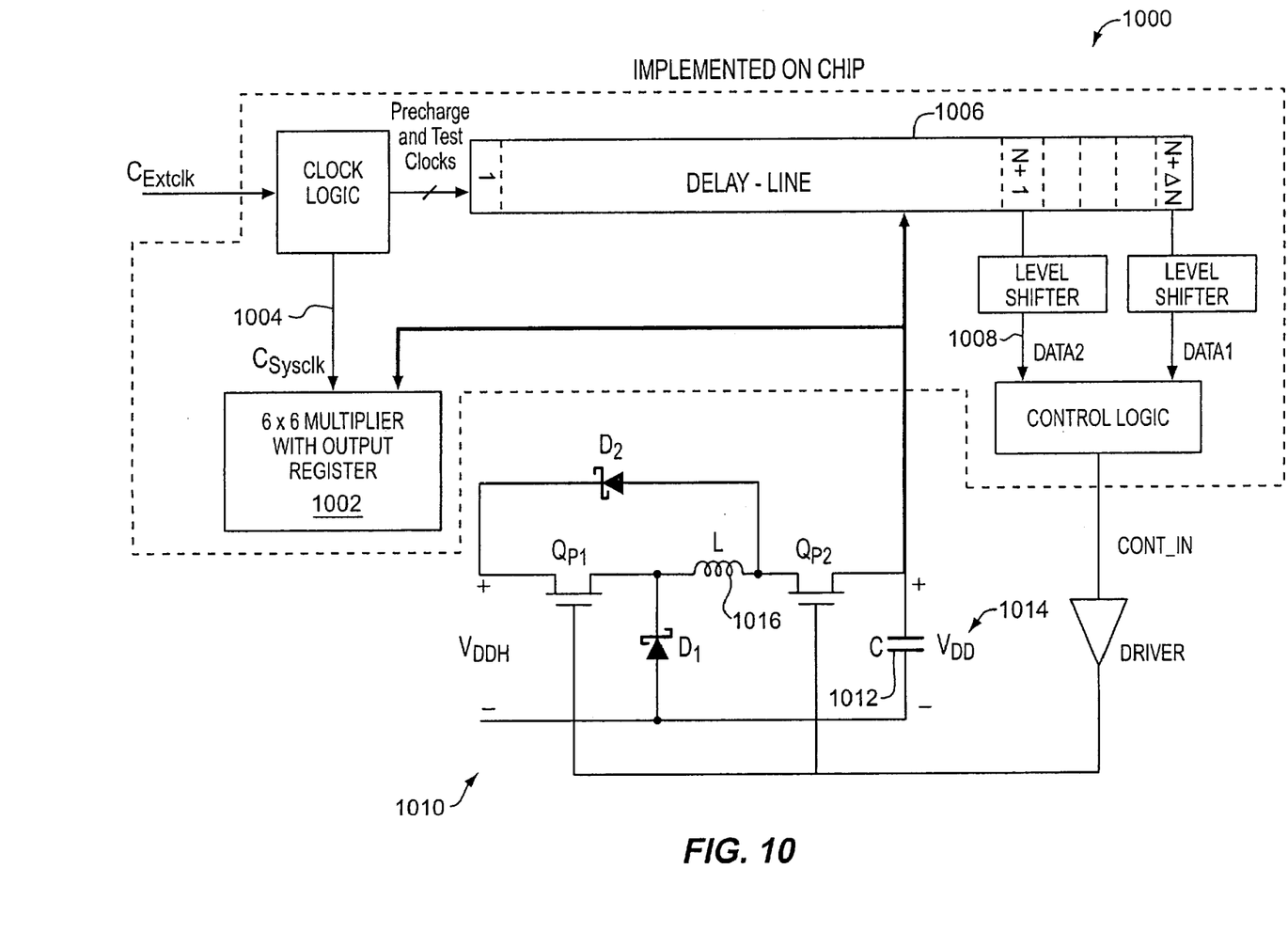
FIG. 10 is a block diagram of a fabricated chip with an external power converter providing voltage supply regulation for a 6×6 multiplier with registered outputs.

In one exemplary embodiment of a critical path delay control system, shown in FIG. 10, the chip contains a 6×6 array multiplier, which was used as an exemplary powered device for the system. The outputs of multiplier 1002 are registered and are updated at the rising edge of system clock 1004. A model extracted from the layout of the multiplier was simulated at the typical process corner to determine that under worst-case input data conditions, and at an operating frequency of 20 MHz, the multiplier needed a supply voltage of 2.8V.

The parameters used in the typical process corner model were then used to design the critical path model of the delay line 1006, with appropriate sizing of the devices in the delay-cell such that for delay line length N+ΔN=20, (ΔN=2), a test clock pulse 1004 at 20 MHz and $V_{DD}$=2.8 V was just able to propagate to the level-shifted tap DATA2 1008. With these parameters, the maximum $\Delta V_{DD}$ is about 150 mV at a $V_{DD}$ value of 2.8V (see equation (7)).

A test circuit for voltage control of multiplier 1002 was designed with power converter 1010 closing a control loop externally as shown in FIG. 10. The delay line for the fabricated chip does not include the delay cells to detect high $V_{DD}$ 1014. Also, during a step change from high to low $f_{Extclk}$, the capacitor is simply allowed to discharge to the lower supply voltage value. From power consumption measurements of the multiplier, $C_m$ (capacitance of the multiplier) was estimated to be about 4 pF (picoFarad). It was desired to have a converter 1010 switching frequency of about 50 kHz at the maximum supply voltage. A capacitance value of 47 nF (nanoFarad) for capacitor 1012 was selected by substituting for values in equation (13).

Separately, it was desired to have a worst-case transient response of less than 15 microseconds for a step change from the lowest system clock frequency of 10 kHz, with $V_{DD}$=0.8 V, to the highest system clock frequency of 20 MHz, where $V_{DD}$=2.8 V. Using equation (1), a value of 750 microHenries was selected for the value of inductor 1016.

Figure 11:
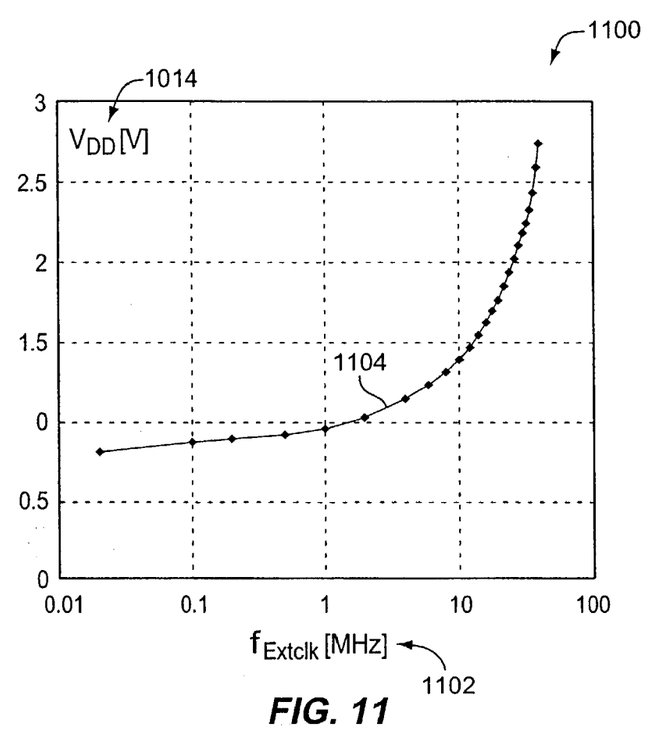
FIG. 11 is a plot of $V_{DD}$ as a function of external clock frequency.

A plot 1104 of $V_{DD}$ 1014 as a function of $f_{Extclk}$ 1102 is shown in FIG. 11. It is observed that the control loop provides $V_{DD}$ 1014 over a very wide range of $f_{Extclk}$ 1102, which is an advantage of the proposed controller. It is possible to realize very low power stand-by operation at very low clock frequency. The proposed controller also makes it possible to maintain the supply voltage close to the threshold voltage of the devices.

Figure 12:
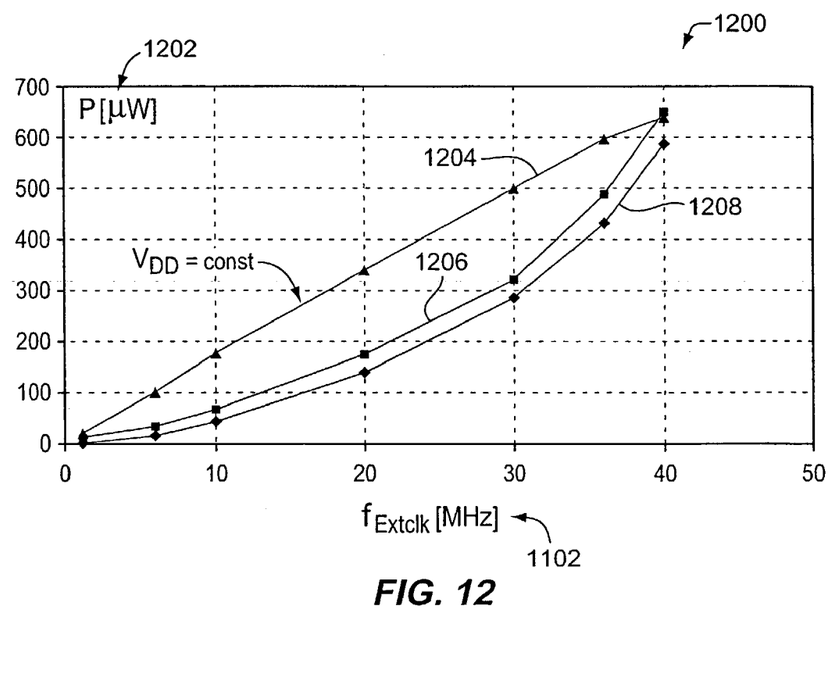
FIG. 12 is a plot of power consumption versus frequency for different voltage supply conditions.

FIG. 12 shows the measured power consumption 1202 as a function of $f_{Extclk}$ 1102 of the powered device 1002 (FIG. 10) compared to fixed $V_{DD}$ operation. For illustration, plot 1208 shows the power consumption 1202 of powered device 1002 alone as a function of external clock frequency 1102. In contrast, plot 1206 shows the power consumption 1202 of powered device 1002 in addition to power consumed by converter 1010 losses.

Figure 13:
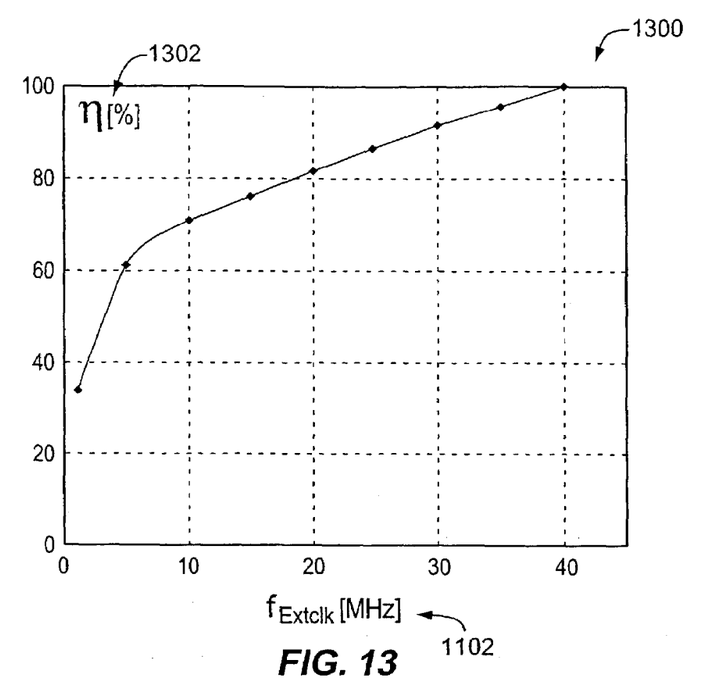
FIG. 13 is a plot of power efficiency of an external voltage regulator versus external clock frequency when using a closed loop control scheme as disclosed herein.

The power consumption levels shown in FIG. 12 are low due to the relatively low level of complexity of multiplier 1002. The power efficiency η 1302 of power converter 1010 over this range of frequencies is plotted 1300 in FIG. 13. Due to low output power levels from converter 1010, converter 1010 losses become significant only at very low frequencies, resulting in low η 1302.

Figure 14:
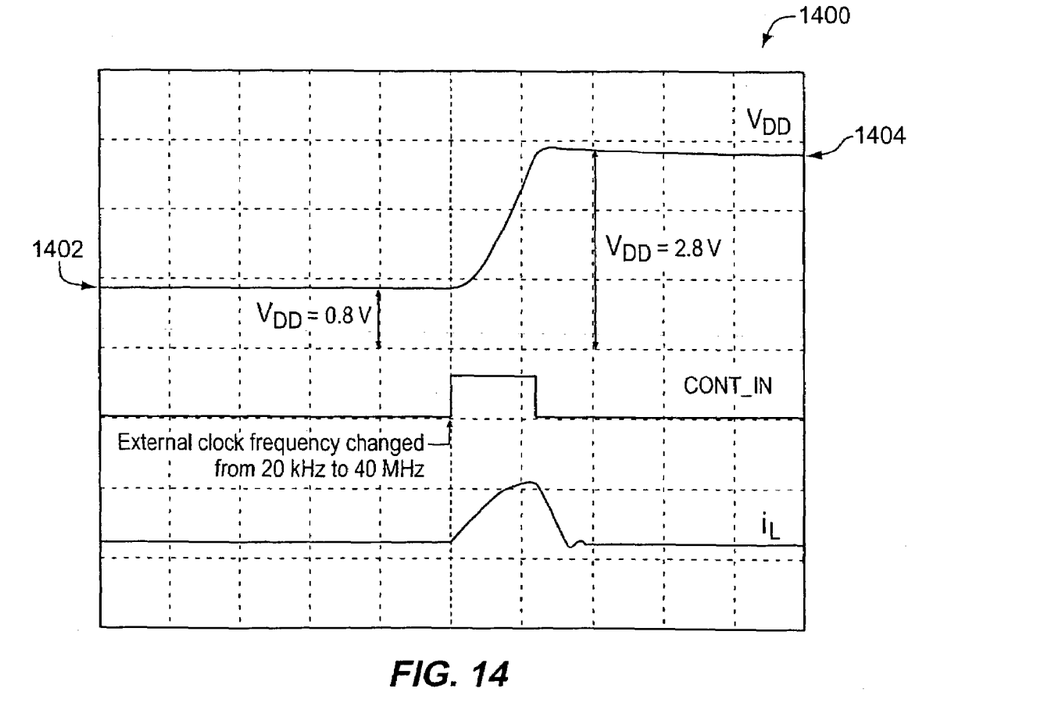
FIG. 14 is a plot of a supply voltage, control signal CONT_IN, and inductor current $i_L$ for the transient time period for a step change in an external clock signal frequency from 20 KHz to 40 MHz.

A second test was designed to demonstrate the fast transient response of the control loop from the lowest operating supply voltage to the maximum supply voltage. Two external clock frequencies, $f_{1,ext}$=20 kHz and $f_{2,ext}$=40 MHz, were applied to a switch that alternated between the two frequencies. Details of this transient response around the vicinity of the step change in frequency are plotted 1400 in FIG. 14. The transient from $V_{DD}$=0.8 V 1402 to $V_{DD}$=2.8 V 1404 takes about 12 microseconds, which compares favorably with results described in the prior art.

Adaptive voltage scaling (AVS) of a supply voltage is emerging as an effective power management technique for digital VLSI applications. This disclosure describes a delay line based regulation scheme which is simple to implement and which allows fast transient response to step changes in speed and stable operation over a very wide range of system clock frequencies. The delay is preferably measured at the system clock rate, which minimizes the system latency. The Watkins-Johnson converter has been shown to be well suited for closed loop delay line regulation. The design criteria for the selection of the converter components is straightforward and is described. A chip including the AVS controller and a small test application has been fabricated in a standard CMOS process. Experimental results demonstrate operation over the clock frequency range from 10 KHz to 20 MHz, and a 12 microsecond transient response for a step change in system clock frequency from 10 kHz to 20 MHz.

There have been described what are, at present, considered to be the preferred embodiments of the invention. It will be understood that the invention can be embodied in other specific forms without departing from its spirit or essential characteristics. For instance, each of the inventive features mentioned above may be combined with one or more of the other inventive features. That is, while all possible combinations of the inventive features have not been specifically described, so as the disclosure does not become unreasonably long, it should be understood that many other combinations of the features can be made. The present embodiments are, therefore, to be considered as illustrative and not restrictive. The scope of the invention is indicated by the appended claims.

The invention claimed is:

1. A method for controlling an operating speed of a powered device having a critical path delay, the method comprising:
   providing a working delay corresponding to a desired value of a variable of interest;
   establishing a lower limit and an upper limit of said critical path delay defining a working delay range about said working delay;
   generating only one of a maximum value and a minimum value of a control output signal when said critical path delay is at one of said established limits, wherein said maximum value is a first control output value that changes said variable of interest in a first direction and said minimum value is a second control output value that changes said variable of interest in a second direction opposite to said first direction;
   and thereafter changing said control output signal only when said critical path delay reaches the other one of said established limits.

2. The method of claim 1 wherein said generating comprises generating said first control output signal when said critical path delay is at said upper limit.

3. The method of claim 1 wherein said generating comprises generating second control output signal when said critical path delay is at said lower limit.

4. The method of claim 1 wherein said variable of interest comprises a supply voltage.

5. The method of claim 1 further comprising maintaining said critical path delay between said established lower limit and said established upper limit.

6. The method of claim 1 wherein said method provides a first order system for controlling said critical path delay.

7. The method of claim 1 further comprising modeling said critical path delay with a delay line.

8. The method of claim 7 wherein said modeling comprises providing a critical path model modeling substantially one half of said critical path delay of said powered device.

9. The method of claim 1 further comprising providing a delay line including a critical path model enabling modeling substantially one-half of said critical path delay.

10. The method of claim 9 wherein said provided delay line enables measurement of said critical path delay in substantially one half of one system clock cycle.

11. The method of claim 9 wherein said providing said delay line comprises providing a sequence of delay cells, each said delay cell having an output indicating whether a clock test signal propagated thereto within a test period.

12. The method of claim 9 wherein said providing said delay line comprises selecting a delay line length based on operating characteristics of said provided powered device.

13. The method of claim 9 wherein said providing said delay line comprises providing delay cells and designing said delay cells based on operating characteristics of said powered device.

14. The method of claim 1 further comprising measuring said critical path delay.

15. The method of claim 14 wherein said measuring comprises identifying an extent of clock signal propagation along a sequence of delay cells.

16. The method of claim 15 wherein said identifying comprises detecting one of a logic "0" output and a logic "1" output for each delay cell in said sequence.

17. The method of claim 1 wherein said powered device is a digital integrated circuit.

18. The method of claim 1 wherein said powered device is a microprocessor.

19. Apparatus for efficiently supplying energy to a powered device in a circuit, said powered device having a critical path delay, said apparatus comprising:
  a delay line operative to model said critical path delay but having a simpler and more compact electronic structure than said powered device;
  control logic responsive to an output from said delay line and operative to generate a control output; and
  a power converter operative to adjust supply voltage to said powered device in response to said generated control output, wherein said delay line, said control logic, and said power converter cooperate to provide control of said supply voltage that bounces said supply voltage between upper and lower limits and adjusts said supply voltage only when said supply voltage reaches said limits.

20. The apparatus of claim 19 wherein said critical path delay is maintained within a working delay range.

21. The apparatus of claim 19 wherein said delay line comprises a critical path model operative to model substantially one half of said critical path delay of said powered device.

22. The apparatus of claim 19 wherein said delay line and said control logic are operative to measure said critical path delay in substantially one half of a system clock cycle.

23. The apparatus of claim 19 wherein said delay line comprises a sequence of delay cells.

24. The apparatus of claim 19 wherein said delay line comprises only one sequence of delay cells.

25. The apparatus of claim 19 wherein a number and a design of delay cells in said delay line are established based on characteristics of said powered device.

26. The apparatus of claim 19 wherein said powered device is a digital integrated circuit.

27. The apparatus of claim 19 wherein said powered device is a microprocessor.

28. A method for efficiently controlling power consumption of a circuit, the method comprising:
  measuring a critical path delay of a powered device in said circuit;
  adjusting a supply voltage to said powered device based on said measured critical path delay; and
  said measuring and said adjusting controlling said critical path delay so that said critical path delay bounces between upper and lower limits and said supply voltage is adjusted based on said measured critical path delay only when said critical path reaches said limits.

29. The method of claim 28 wherein said adjusting enables keeping said critical path delay within a working delay range.

30. The method of claim 28 wherein said adjusting continuously provides substantially lowest supply voltage needed to operate said powered device.

31. The method of claim 28 wherein said measuring comprises measuring test signal propagation along a delay line.

32. The method of claim 28 wherein said measuring comprises determining said critical path delay in substantially one half of a system clock cycle.

33. The method of claim 28 wherein said measuring comprises measuring test signal propagation along a critical path model, said critical path model modeling substantially one half of said critical path delay of said powered device.

34. The method of claim 28 wherein said powered device is a digital integrated circuit.

35. The method of claim 28 wherein said powered device is a microprocessor.

36. A method of controlling a variable of interest in a powered device, said method comprising:
  providing a line;
  precharging said delay line to a known state;
  thereafter, sending a test pulse down said delay line;
  determining the delay of said test pulse; and
  using said delay to control said variable of interest in said powered device which is other than said delay line.

37. A method as in claim 36 wherein said variable of interest is a voltage applied to said powered device.

* * * * *